United States Patent
Zaltsman et al.

(10) Patent No.: US 8,914,670 B2
(45) Date of Patent: Dec. 16, 2014

(54) REDUNDANCY SCHEMES FOR NON-VOLATILE MEMORY USING PARITY ZONES HAVING NEW AND OLD PARITY BLOCKS

(71) Applicant: Apple Inc., Cupertino, CA (US)

(72) Inventors: Etai Zaltsman, Ramat-Hasharon (IL); Julian Vlaiko, Kfar Saba (IL); Ori Moshe Stern, Modi'in (IL); Avraham Poza Meir, Rishon Le-Zion (IL)

(73) Assignee: Apple Inc., Cupertino, CA (US)

( * ) Notice: Subject to any disclaimer, the term of this patent is extended or adjusted under 35 U.S.C. 154(b) by 223 days.

(21) Appl. No.: 13/670,604

(22) Filed: Nov. 7, 2012

(65) Prior Publication Data

US 2014/0129874 A1     May 8, 2014

(51) Int. Cl.
*G06F 11/00* (2006.01)
(52) U.S. Cl.
USPC .............................. 714/6.24; 714/6.1; 714/6.2
(58) Field of Classification Search
USPC ........................................... 714/6.1, 6.2, 6.24
See application file for complete search history.

(56) References Cited

U.S. PATENT DOCUMENTS

| | | |
|---|---|---|
| 7,054,991 B2 | 5/2006 | Tanaka et al. |
| 7,559,004 B1 | 7/2009 | Chang et al. |
| 8,341,503 B1 | 12/2012 | Yoon et al. |
| 2010/0115332 A1* | 5/2010 | Zheng et al. ....................... 714/6 |
| 2011/0154105 A1* | 6/2011 | Woodhouse ................. 714/6.24 |
| 2012/0198152 A1 | 8/2012 | Terry et al. |
| 2013/0151892 A1* | 6/2013 | Huang et al. ..................... 714/14 |
| 2013/0205102 A1* | 8/2013 | Jones et al. .................... 711/154 |

* cited by examiner

*Primary Examiner* — Sarai Butler
(74) *Attorney, Agent, or Firm* — Meyertons, Hood, Kivlin, Kowert & Goetzel, P.C.

(57) ABSTRACT

A method includes, in a non-volatile memory that includes multiple memory blocks, defining a redundancy zone that includes at least an old parity block, a new parity block and multiple active blocks of which one block is defined as an open block. Data is stored in the redundancy zone and the stored data is protected, such that new input data is stored in the open block, redundancy information for the active blocks including the open block is stored in the new parity block, and the redundancy information for the active blocks excluding the open block is stored in the old parity block. Upon filling the open block and the new parity block, an alternative block is assigned to serve as the open block and the new parity block is assigned to serve as the old parity block.

22 Claims, 3 Drawing Sheets

| Block A | Block B | Block C | Open Block | New Parity | Old Parity | Retired |
|---|---|---|---|---|---|---|
| An | Bn | Cn | | | An+Bn+Cn+Rn | Rn |
| | | | erased | erased | | |
| | | | | | | |
| | | | | | | |
| Ai | Bi | Ci | Oi | Ai+Bi+Ci+Oi | Ai+Bi+Ci+Ri | Ri |
| | | | | | | |
| | | | | | | |
| A1 | B1 | C1 | O1 | A1+B1+C1+O1 | A1+B1+C1+R1 | R1 |
| A0 | B0 | C0 | O0 | A0+B0+C0+O0 | A0+B0+C0+R0 | R0 |

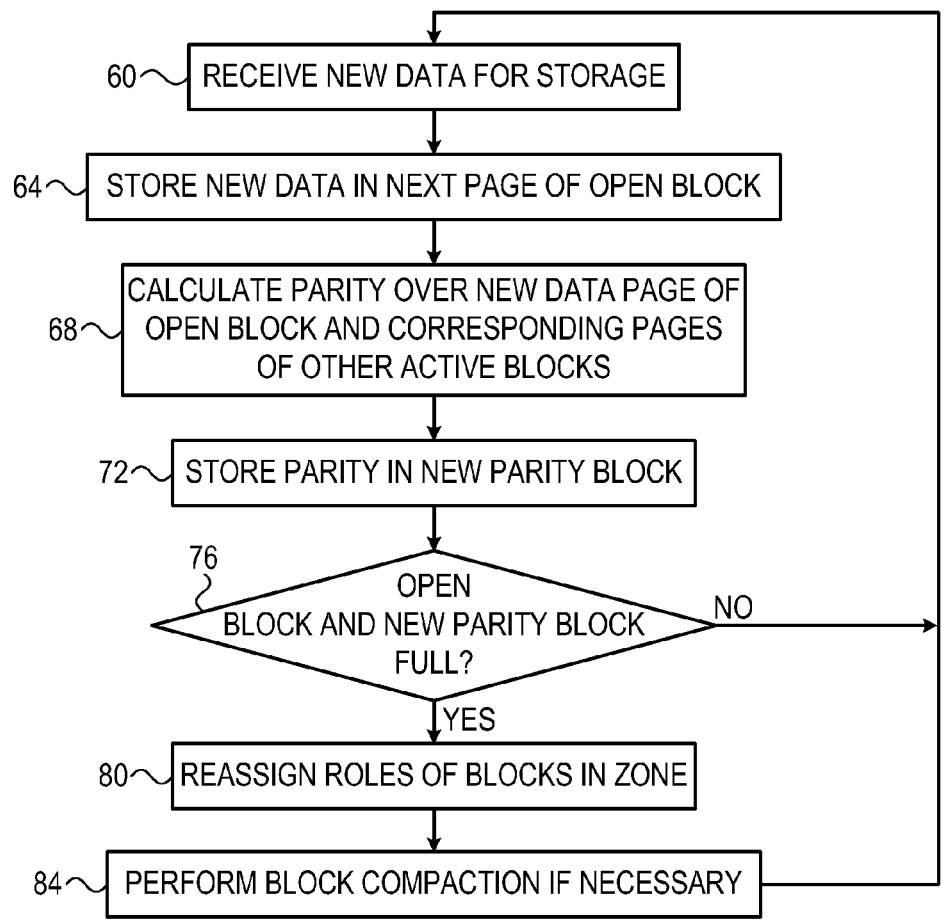

REDUNDANCY SCHEMES FOR NON-VOLATILE MEMORY USING PARITY ZONES HAVING NEW AND OLD PARITY BLOCKS

FIELD OF THE INVENTION

The present invention relates generally to data storage, and particularly to methods and systems for redundant data storage in non-volatile memory.

BACKGROUND OF THE INVENTION

Some data storage systems apply redundant storage schemes, such as Redundant Array for Inexpensive Disks (RAID) schemes, in solid state non-volatile memory. For example, U.S. Pat. No. 5,680,579, whose disclosure is incorporated herein by reference, describes a device employing a redundant array of solid state memory devices, whereby RAID technology architecture is combined with solid state memory devices.

As another example, U.S. Patent Application Publication 2006/0053308, whose disclosure is incorporated herein by reference, describes a storage device consisting of multiple solid state memory devices and a memory controller. The memory devices are configured as a redundant array, such as a RAID memory array. The memory controller performs data encryption to provide secured access to the array.

SUMMARY OF THE INVENTION

An embodiment of the present invention that is described herein provides a method including, in a non-volatile memory that includes multiple memory blocks, defining a redundancy zone that includes at least an old parity block, a new parity block and multiple active blocks of which one block is defined as an open block. Data is stored in the redundancy zone and the stored data is protected, such that new input data is stored in the open block, redundancy information for the active blocks including the open block is stored in the new parity block, and the redundancy information for the active blocks excluding the open block is stored in the old parity block. Upon filling the open block and the new parity block, an alternative block is assigned to serve as the open block and the new parity block is assigned to serve as the old parity block.

In some embodiments the method includes, upon detecting a failure in a memory block in the redundancy zone, reconstructing the data stored in the failed memory block using the redundancy information stored in the new parity block and in the old parity block. In an embodiment, the alternative block includes a retired memory block that includes only invalid data.

In some disclosed embodiments, the open block and the other active blocks each includes a respective super-block made-up of a first predefined number of the memory blocks, and the new parity block and the old parity block each includes a second predefined number of the memory blocks that is different from the first number. In an example embodiment, each super-block includes multiple super-pages, each made-up of a set of corresponding pages from the memory blocks of the super-block, and storing the data includes accumulating the new data in volatile memory until a full super-page of the new data is available for storage, and then storing and protecting the full super-page in the redundancy zone.

In another embodiment, the redundancy zone includes multiple super-blocks, and the method includes, upon failure of some of the memory blocks in the super-blocks, forming a new super-block from functional memory blocks drawn from the super-blocks having the failed memory blocks.

In yet another embodiment, the method includes alternating an assignment of the new parity block and the old parity block among the memory blocks of the redundancy zone. In still another embodiment, the memory blocks include multi-level memory cells that are each capable of storing at least a Least Significant Bit (LSB) and a Most Significant Bit (MSB), and protecting the stored data includes storing the redundancy information using only the LSB of the memory cells.

In an embodiment, defining the redundancy zone includes selecting the memory blocks for inclusion in the redundancy zone in an interleaved manner from a total plurality of the memory blocks of the non-volatile memory. In another embodiment, assigning the alternative block includes assigning a new open block in another redundancy zone.

There is additionally provided, in accordance with an embodiment of the present invention, apparatus including an interface and a processor. The interface is configured to communicate with a non-volatile memory that includes multiple memory blocks. The processor is configured to define in the non-volatile memory a redundancy zone that includes at least an old parity block, a new parity block and multiple active blocks of which one block is defined as an open block, to store data in the redundancy zone and protect the stored data such that new input data is stored in the open block, redundancy information for the active blocks including the open block is stored in the new parity block, and the redundancy information for the active blocks excluding the open block is stored in the old parity block, and, upon filling the open block and the new parity block, to assign an alternative block to serve as the open block and to assign the new parity block to serve as the old parity block.

There is also provided, in accordance with an embodiment of the present invention, a method including, in a non-volatile memory that includes multiple memory blocks, defining a redundancy zone that includes at least a parity super-block and multiple active super-blocks, one of which is defined as an open super-block, wherein each of the super-blocks includes two or more of the memory blocks of the memory. Data is stored in the redundancy zone and the stored data is protected, such that new input data is stored in the open super-block, redundancy information for the active super-blocks including the open super-block is stored in a first area of the parity super-block, and the redundancy information for the active super-blocks excluding the open super-block is stored in a second area of the parity super-block. Upon detecting a failure in a memory block in the redundancy zone, the data stored in the failed memory block is reconstructed using the redundancy information stored in the parity super-block.

There is further provided, in accordance with an embodiment of the present invention, apparatus including an interface and a processor. The interface is configured to communicate with a non-volatile memory that includes multiple memory blocks. The processor is configured to define in the non-volatile memory a redundancy zone that includes at least a parity super-block and multiple active super-blocks, one of which is defined as an open super-block, wherein each of the super-blocks includes two or more of the memory blocks of the memory, to store data in the redundancy zone and protect the stored data such that new input data is stored in the open super-block, redundancy information for the active super-blocks including the open super-block is stored in a first area of the parity super-block, and the redundancy information for the active super-blocks excluding the open super-block is stored in a second area of the parity super-block, and, upon detecting a failure in a memory block in the redundancy zone, to reconstruct the data stored in the failed memory block using the redundancy information stored in the parity super-block.

The present invention will be more fully understood from the following detailed description of the embodiments thereof, taken together with the drawings in which:

BRIEF DESCRIPTION OF THE DRAWINGS

FIG. 3 is a flow chart that schematically illustrates a method for redundant data storage, in accordance with an embodiment of the present invention;

FIG. 4 is a diagram showing the structure of a redundancy zone using super-blocks, in accordance with an embodiment of the present invention.

DETAILED DESCRIPTION OF EMBODIMENTS

Overview

Figures 1, 2:
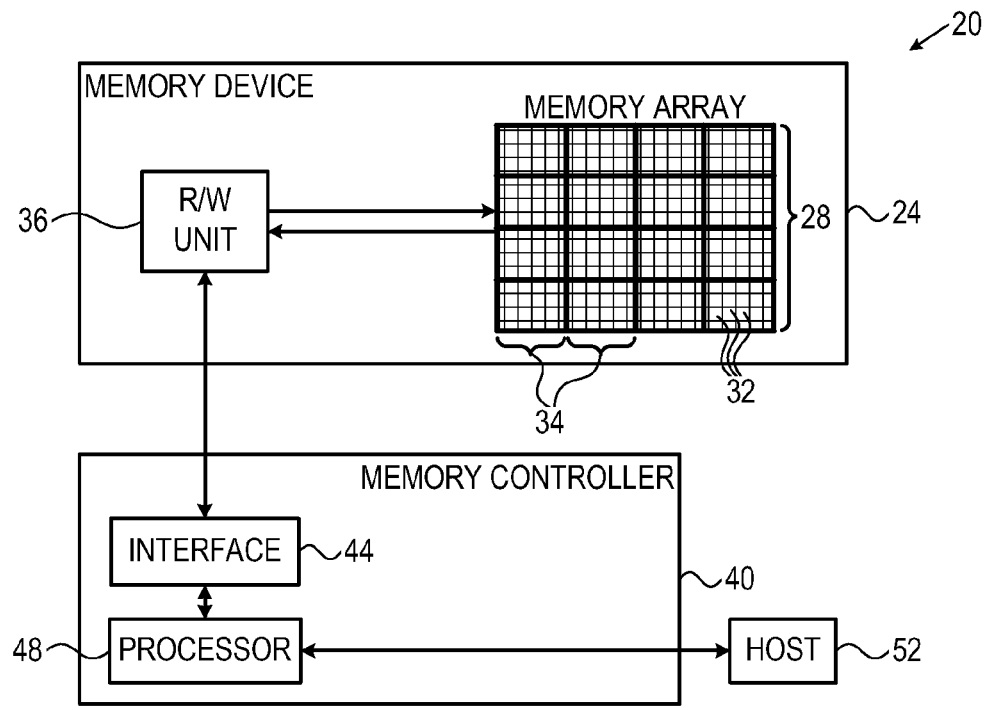
FIG. 1 is a block diagram that schematically illustrates a memory system, in accordance with an embodiment of the present invention.
FIG. 2 is a diagram showing the structure of a redundancy zone defined in a non-volatile memory, in accordance with an embodiment of the present invention.

Embodiments of the present invention that are described herein provide improved methods and systems for redundant data storage in non-volatile memory, such as Flash memory. In some disclosed embodiments, a memory controller stores data in a non-volatile memory that comprises multiple memory blocks.

The memory controller defines one or more redundancy zones in the non-volatile memory. Each redundancy zone comprises multiple memory blocks that are assigned specific roles by the memory controller. In some embodiments, each redundancy zone comprises at least an old parity block, a new parity block, multiple active blocks of which one block is defined as an open block for storing new data, and in most cases one retired block that contains only invalid data.

In an embodiment, a redundancy zone may be in an active state, an active-not-full state, and an inactive state. In the active state the zone comprises an open block, a new parity block, an old parity block and a retired block. The retired block is a block whose pages contain only invalid data ("garbage"). The open block is used for storing new data. The new parity block stores redundancy information calculated over corresponding pages in the active blocks including the open block. The old parity block stores redundancy information calculated over the corresponding pages in the retired block and the active blocks excluding the open block.

The active-not-full state is an initial state, used before the active blocks in a zone become full. In this temporary state there is no need for a retired block. The old parity block stores redundancy information of blocks that were filled up to this point. In the inactive state, the zone is not ready for updates, and new data is written to other zones. In this state the zone does not include a new parity block and an open block. A retired block is optional, as well.

When new data arrives for storage, the memory controller stores the new data in a redundancy zone such that:

The new input data is stored in one or more pages of the open block.

For each new data page in the open block, redundancy information (e.g., bit-wise XOR) is computed over the new data page and over the corresponding pages of the other active blocks. The redundancy information is stored in the corresponding page of the new parity block.

When the open block and the new parity block are fully programmed, the memory controller assigns an a new block from a pool of available free blocks (or alternatively the retired block) to serve as the open block, and assigns the new parity block to serve as the old parity block.

The disclosed redundant storage scheme provides a high level of protection against memory block failures, using only a small number of parity blocks. As such, these techniques are well suited for protecting large regions of memory while incurring only a small memory overhead. In an example embodiment, a zone may include on the order of 400 blocks, and the overhead is only two blocks (the new and old parity blocks), i.e., on the order of 0.5% overhead. In a typical application, the disclosed techniques are used in memory devices having a small number of memory dies, e.g., single-die devices.

Additional embodiments that are described further below provide additional variations and performance improvements, such as implementations that use super-blocks and super-pages instead of individual blocks and pages, and implementations that interleave data across multiple blocks or dies.

System Description

FIG. 1 is a block diagram that schematically illustrates a memory system 20, in accordance with an embodiment of the present invention. System 20 can be used in various host systems and devices, such as in computing devices, cellular phones or other communication terminals, removable memory modules (Such as "USB Flash Drives" or "memory cards"), Solid State Disks (SSD), digital cameras, music and other media players and/or any other system or device in which data is stored and retrieved.

System 20 comprises a memory device 24, which stores data in a memory cell array 28. The memory array comprises multiple memory blocks 34. Each memory block 34 comprises multiple analog memory cells 32. In the context of the present patent application and in the claims, the term "analog memory cell" is used to describe any memory cell that holds a continuous, analog value of a physical parameter, such as an electrical voltage or charge. Array 28 may comprise analog memory cells of any kind, such as, for example, NAND, NOR and Charge Trap Flash (CTF) Flash cells, phase change RAM (PRAM, also referred to as Phase Change Memory—PCM), Nitride Read Only Memory (NROM), Ferroelectric RAM (FRAM), magnetic RAM (MRAM) and/or Dynamic RAM (DRAM) cells. Although the embodiments described herein refer mainly to two-dimensional (2D) cell connectivity schemes, the disclosed techniques are applicable to three-dimensional (3D) connectivity schemes, as well.

The charge levels stored in the cells and/or the analog voltages or currents written into and read out of the cells are referred to herein collectively as analog values, analog storage values or storage values. The storage values may comprise, for example, threshold voltages or any other suitable kind of storage values. System 20 stores data in the analog memory cells by programming the cells to assume respective programming states, which are also referred to as programming levels. The programming states are selected from a finite set of possible states, and each programming state corresponds to a certain nominal storage value. For example, a 3 bit/cell MLC can be programmed to assume one of eight possible programming states by writing one of eight possible nominal storage values into the cell.

Memory device 24 comprises a reading/writing (R/W) unit 36, which converts data for storage in the memory device to analog storage values and writes them into memory cells 32. In alternative embodiments, the R/W unit does not perform the conversion, but is provided with voltage samples, i.e., with the storage values for storage in the cells. When reading data out of array 28, R/W unit 36 converts the storage values of memory cells into digital samples having a resolution of one or more bits. Data is typically written to and read from the memory cells in groups that are referred to as pages. In some embodiments, the R/W unit can erase a group of cells 32 by applying one or more negative erasure pulses to the cells. Erasure is typically performed in entire memory blocks.

The storage and retrieval of data in and out of memory device 24 is performed by a memory controller 40. The memory controller comprises an interface 44 for communicating with memory device 24, and a processor 48 that carries out the various memory management functions. Memory controller 40 communicates with a host 52, for accepting data for storage in the memory device and for outputting data retrieved from the memory device. Memory controller 40, and in particular processor 48, may be implemented in hardware. Alternatively, the memory controller may comprise a microprocessor that runs suitable software, or a combination of hardware and software elements.

The configuration of FIG. 1 is an exemplary system configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity.

Although the example of FIG. 1 shows a single memory device 24, system 20 may comprise multiple memory devices that are controlled by memory controller 40. In the exemplary system configuration shown in FIG. 1, memory device 24 and memory controller 40 are implemented as two separate Integrated Circuits (ICs). In alternative embodiments, however, the memory device and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which the memory array is disposed. Further alternatively, some or all of the functionality of memory controller 40 can be implemented in software and carried out by a processor or other element of the host system. In some embodiments, host 44 and memory controller 40 may be fabricated on the same die, or on separate dies in the same device package.

In some embodiments, memory controller 40 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In an example configuration of array 28, memory cells 32 are arranged in multiple rows and columns, and each memory cell comprises a floating-gate transistor. The gates of the transistors in each row are connected by word lines, and the sources of the transistors in each column are connected by bit lines. The memory array is typically divided into multiple pages, i.e., groups of memory cells that are programmed and read simultaneously. Pages are sometimes sub-divided into sectors. In some embodiments, each page comprises an entire row of the array. In alternative embodiments, each row (word line) can be divided into two or more pages. For example, in some devices each row is divided into two pages, one comprising the odd-order cells and the other comprising the even-order cells.

Typically, memory controller 40 programs data in page units, but erases entire memory blocks 34. Typically although not necessarily, a memory block is on the order of $10^6$ memory cells, whereas a page is on the order of $10^3$-$10^4$ memory cells.

Redundant Storage Using New and Old Parity Blocks

In some embodiments, processor 48 of memory controller 40 stores data in memory device 24 using a redundancy scheme that provides a high degree of protection against memory block failures. The protection is provided while incurring only a small memory space overhead.

The disclosed scheme is particularly suitable for memory devices having a small number of memory dies, e.g., single-die applications, but is useful in multiple-die systems as well. The description that follows does not refer to individual dies, but rather to memory blocks that can be physically located on one or more dies, as appropriate.

In some embodiments, processor 48 defines one or more redundancy zones in memory device 24. Each redundancy zone comprises multiple memory blocks 34. In a given redundancy zone, processor 48 assigns one block to serve as an open block for storing new data, a new parity block and an old parity block for storing redundancy information computed over the data, and in most cases one retired block that holds only invalid data. The redundancy zones are referred to below as simply "zones" for brevity.

The blocks in the zone that store valid data, including the open block, are referred to as active blocks. In other words, the active blocks are the blocks that comprise at least some valid data. In addition, processor 48 maintains a logging mechanism, which logs the operations performed in the zone.

The different types of blocks are not necessarily associated with fixed physical storage locations. Typically, processor 48 changes the assignment over time, so as to balance the wear of the memory blocks across the whole media. For example, the old and new parity blocks are accessed much more frequently than the active blocks, and therefore it is desirable to alternate their assignment among different physical blocks.

At any given time, new data that is received for storage is stored by processor 48 in the next available pages in the open block. The new parity block holds redundancy information (in the present example bit-wise parity or bit-wise XOR) that is calculated over corresponding pages in all the active blocks in the zone (including the open block).

The old parity block holds redundancy information that is calculated over corresponding pages in all the active blocks in the zone excluding the open block, and over the corresponding pages in the retired block or blocks. In other words, the old parity block holds redundancy information that is calculated over corresponding pages in all the active blocks prior to the latest update. The retired blocks are removed from the redundancy calculation every time the processor starts to write to a new parity block, and can be erased once all their pages have been removed from the redundancy calculation.

Although the embodiments described herein refer to bit-wise parity calculated using bit-wise XOR, processor 48 may calculate any other suitable type of redundancy information.

FIG. 2 is a diagram showing the structure of a redundancy zone defined in memory device 24, in accordance with an embodiment of the present invention. Each column in FIG. 2 shows the data pages stored in a respective memory block. The storage of data pages is assumed to be sequential in ascending order of pages. Sequential programming advances from bottom to top in each column (block) of FIG. 2.

In the present example, the zone comprises three active blocks denoted A, B and C in addition to the open block denoted O. A retired block is denoted R. The pages stored in each block are marked with the block initial and an incrementing index. Each block comprises n+1 pages numbered from 0 to n. As can be seen in the figure, each page of the old parity block stores a XOR of the corresponding pages in blocks A, B, C and R. At the point in time shown in the figure, pages $O_0, O_1, \ldots, O_i$ have been written to the open block, and the remaining pages of the open block are still erased. Therefore, processor 48 has programmed pages 0 . . . i of the new parity block with the appropriate redundancy information, and the remaining pages of the new parity block are still erased.

Typically, when the new data fills the open block (and therefore the redundancy information fills the new parity block), processor 48 erases the old parity block and reassigns it to serve as the open block, assigns the new parity block to serve as the old parity block, and erases the retired block and assigns it to serve as the new parity block.

FIG. 3 is a flow chart that schematically illustrates a method for redundant data storage in system 20, in accordance with an embodiment of the present invention. The method begins with processor 48 of memory controller 40 receiving new data for storage from host 52, at an input step 60. Processor 48 stores the new data in the next page of the open block, at a data storage step 64.

Processor 48 calculates redundancy information (e.g., parity) over the new data page of the open block and over the corresponding pages in the other active blocks, at a redundancy calculation step 68. This calculation may be performed, for example, by reading the corresponding page from the old parity block, XOR-ing the read page with the corresponding page read from the retired block and with the corresponding page of the open block (i.e., the new data). Processor 48 stores the redundancy information in the corresponding page of the new parity block, at a redundancy storage step 72.

Processor 48 checks whether the open block and the new parity block are full, at a fill checking step 76. If not, the method loops back to step 60 above. If the open block and the new parity block are full, processor 48 reassigns the roles of the different blocks and prepares for storing subsequent data in new blocks, at a reassignment step 80.

Processor 48 may reassign the roles of the blocks in various ways. Generally, the retired block or the old parity block can be erased and used as the new parity block and the new open block. Alternatively, the retired block and the old parity block can be erased and moved to free block pool. In the example embodiment, processor 48 erases the old parity block and reassigns it to serve as the open block, assigns the new parity block to serve as the old parity block, and erases the retired block and assigns it to serve as the new parity block.

If necessary, processor 48 perform block compaction ("garbage collection") on one of the blocks in the zone, until all the valid data in that block is no longer needed, e.g., until newer versions of the data are written, or until the data is copied to another zone or to the open block in accordance with the scheme above. The method then loops back to step 60 above for receiving new data.

At any time during the process of FIGS. 2 and 3, the redundancy information in the new parity block protects all the pages in all the active blocks in the zone, including the open block, until the index of the last page programmed in the open block. The redundancy information in the old parity block protects all the pages in all the active blocks in the zone above this index, as well as the retired block.

Thus, if any of the blocks fail, processor 48 can reconstruct the data stored in the failed block using the old and new parity blocks. If, for example, active block B fails, processor 48 can reconstruct pages $B_0 \ldots B_i$ by XOR-ing the corresponding pages in blocks A, C, the open block and the new parity block. Pages $B_{i+1} \ldots B_n$ can be reconstructed by XOR-ing the corresponding pages in blocks A, C, the retired block and the old parity block.

In some embodiments, processor 48 may store the redundancy information (in the new parity block) at any desired time after storing the new data (in the open block).

In some embodiments, memory cells 32 comprise Multi-Level Cells (MLC), such that each memory cell stores at least a Least Significant Bit (LSB) and a Most Significant Bit (MSB). In these embodiments, each group of memory cells stores two or more pages. Processor 48 may use only the low-order bits/pages, i.e., the LSB bits/pages of the new parity page for storing the redundancy information. This feature reduces the performance degradation incurred by the redundant storage scheme. In an alternative embodiment, processor 48 stores the redundancy information in the new parity block using Single-Level Cell (SLC) programming, i.e. using programming levels that are optimized for SLC-only programming. This mode of programming is different from, and slightly superior than, programming only the lower MLC pages. In either embodiment, the new data is stored with a certain storage density (e.g., two or three bits/cell) and the redundancy information is stored with a smaller storage density (e.g., 1 bit/cell).

Performance Improvement Using Super-Blocks

As with any redundant storage scheme implemented in non-volatile memory, the above-described scheme incurs a certain amount of write amplification, i.e., additional write operations. In some embodiments, write amplification can be reduced by implementing the scheme of FIGS. 2 and 3 using super-blocks. Each super-block comprises a predefined number of blocks 34, e.g., four blocks. Corresponding pages in the blocks of a super-block are referred to as a super-page.

In these embodiments, the blocks in the above-described scheme (e.g., the active blocks including the open block and the retired block) comprise super-blocks instead of individual blocks. When new data is received for storage (step 60 of FIG. 3), processor 48 accumulates an entire super-page of new data before proceeding. The data may be accumulated, for example, in a Random Access Memory (RAM) of memory controller 40 (not shown in the figures).

When using super-blocks, write amplification is reduced by having a single parity page (or a small group of parity pages) for each super-page being written. Without using super-blocks, for each updated page a respective parity page is written, i.e., a write amplification factor of 2. When using four-block super-blocks, on the other hand, the write amplification factor is only 1.25. Generally, a super-block comprises a group of blocks. The new and old parity blocks, however, each comprises a single block or a smaller group of blocks than the super-block (or more generally, a group of blocks that is different in size than the super-block).

When a super-page of new data has been accumulated, processor 48 stores it in the next available super-page of the open super-block (step 64 of FIG. 3), calculates a new page of redundancy information over the corresponding pages of the active super-blocks (step 68), and stores the redundancy information in the corresponding page of the new parity super-block (step 72).

When using super-blocks, write amplification is reduced considerably relative to using individual blocks. The write amplification factor can be written as $A \cdot (1+1/N)$, wherein A denotes the original write amplification (without the redundant storage scheme at all), and N denotes the number of blocks per super-block. For $A=10$, for example, the write amplification using 4-block super-blocks is only 12.5.

In one example embodiment, processor 48 uses 4-block super-block, and uses only the lower page for storing redundancy information. In this embodiment, two blocks are assigned for new parity, two blocks are assigned for old parity, four blocks (one super-block) are regarded as a retired super-block, four blocks (one super-block) are used as the open super-block, and additional 504 blocks (126 super-blocks) store old data or belong to the list of free blocks. Processor 48 carries out the above-described storage scheme until filling the open and new parity super-blocks.

At this stage, the open super-block and new parity super-blocks are closed. The old parity block and the retired super-block contain only invalid data and are not involved in the redundancy scheme or its data structures. Processor 48 fills the open super-block in another redundancy zone. As a result, the current redundancy zone is being punched, i.e., contains invalid data. This situation continues until at least one additional super-block (other than the retired super-block) becomes fully punched (i.e., free).

At this stage, processor 48 selects the current redundancy zone to have a newly-assigned open super-block. Processor 48 assigns the new parity block to serve as the old parity block, and creates a new open super-block.

In an alternative embodiment, processor 48 fills the open and new parity blocks as in the previous embodiment. At this stage the open super-block and the new parity block are closed. A new erased super-block is assigned to serve as the new open super-block, in one of the redundancy zones that has no open super-block. The old parity block and the retired super-block contain only invalid data and are not involved in the storage scheme or its data structures. As a result, the retired super-block can be joined to another redundancy zone. In order to start operating in a new redundancy zone (or a previous zone), that zone should have at least one fully-punched block. Processor 48 then restructures the zone by assigning the new parity block to serve as the old parity block, creating a new open super-block using two retired blocks (possibly part of the other redundancy zone) and two blocks from the old retired super-blocks. As before, a policy may select blocks having higher or lower endurance for this purpose.

FIG. 4 is a diagram showing the structure of a redundancy zone using parity-super-blocks, in accordance with an embodiment of the present invention. In this embodiment, the old parity block and the new parity block are merged into a single super-block that is referred to as a parity super-block. In the present example (although not necessarily) each super-page comprises four pages.

For each super-page, processor 48 writes one respective parity page. Therefore, each super-block can store four parity blocks. In FIG. 4, PN denotes new parity and PO denotes old parity. Upon opening a new open block, a new quarter of a parity block will be allocated for the new parity, while the previous quarter is used as old parity. When the parity block becomes full, a new super-block is allocated for the parity block. The old parity super-block is retained until the parity information in this super-block becomes irrelevant.

Block Management Schemes

In some embodiments, processor 48 selects which blocks should belong to which redundancy zone using a suitable policy. In an example policy, the processor first determines the number of zones based on (i) the number of open blocks needed in the system, (ii) the permitted overhead, and (iii) the permitted recovery time (since for recovery of a page it is necessary to read all the corresponding pages in the zone). Then, the processor assigns blocks to zones such that the blocks in a given zone are physically remote from each other. For example, the processor may first assign to a given zone blocks from different dies, and then blocks from different physical areas in the die.

In some embodiments, processor 48 defines the number of blocks per redundancy zone separately for each Flash die, in order to optimize the die utilization. For example, the processor may set the redundancy zone size depending on the number of bad blocks detected in the die. In such an embodiment we can write:

NUMBER_OF_ZONES=[ACTUAL_OF_SUPER-BLOCKS_IN_DIE/BASIC_ZONE_SIZE]

In an embodiment, all zones except the last one will have the size of:

REGULAR_ZONE_SIZE=[ACTUAL_OF_SUPER-BLOCKS_IN_DIE/NUMBER_OF_ZONES]

and the last zone will be larger and comprise the remaining super-blocks.

In various embodiments, processor 48 may select any desired group of blocks 34 and group them in a redundancy zone. In an example embodiment, each zone comprises a group of N consecutive blocks. This sort of selection, however, may be susceptible to failures, for example because a defect in the die may impact several adjacent blocks.

In an alternative embodiment, processor 48 defines the redundancy zones in an interleaved manner, such that each zone comprises blocks that are distant from one another on the die. This sort of selection improves the redundancy performance, because it reduces the likelihood that multiple blocks in the same redundancy zone will fail together.

Figure 5:
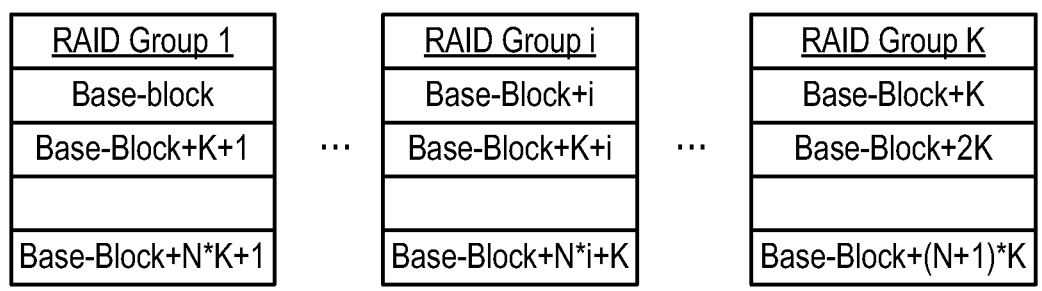
FIG. 5 is a diagram that schematically illustrates a block interleaving scheme, in accordance with an embodiment of the present invention.

FIG. 5 is a diagram that schematically illustrates a block interleaving scheme, in accordance with an embodiment of the present invention. In the present example, a Flash die comprises K redundancy zones (also referred to as RAID groups). As can be seen in the figure, the blocks are assigned to the various RAID groups in an interleaved manner, so that each RAID group comprises blocks that are distant from one another.

In alternative embodiments, processor 48 may select blocks to include in the various redundancy zones using any other suitable technique or criterion.

Typically, the number of bad blocks in a given die increases over time, as new failures appear during the lifetime of the memory. In some embodiments, when a block becomes bad, the super-block to which the block belongs will also be declared as bad, and the remaining blocks in this super-block are referred to as orphan blocks. In some embodiments, processor 48 groups orphan blocks together to form new super-blocks. The new super-blocks can be added, for example, to the smallest redundancy zone in the die. In an embodiment, this addition is performed after the last super-pages of the open and new parity super-blocks in the zone are written. In this embodiment, the newly-added super-block is assigned to serve as the new open super-block, and the old parity super-block is erased and assigned to serve as the new parity super-block.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a non-volatile memory that includes multiple memory blocks, defining a redundancy zone that comprises at least an old parity block, a new parity block and multiple active blocks of which one block is defined as an open block;
   storing data in the redundancy zone and protecting the stored data such that new input data is stored in the open block, redundancy information for the active blocks including the open block is stored in the new parity block, and the redundancy information for the active blocks excluding the open block is stored in the old parity block; and
   upon filling the open block and the new parity block, assigning an alternative block to serve as the open block and assigning the new parity block to serve as the old parity block.

2. The method according to claim 1, and comprising, upon detecting a failure in a memory block in the redundancy zone, reconstructing the data stored in the failed memory block using the redundancy information stored in the new parity block and in the old parity block.

3. The method according to claim 1, wherein the alternative block comprises a retired memory block that comprises only invalid data.

4. The method according to claim 1, wherein the open block and the other active blocks each comprises a respective super-block made-up of a first predefined number of the memory blocks, and wherein the new parity block and the old parity block each comprises a second predefined number of the memory blocks that is different from the first number.

5. The method according to claim 4, wherein each super-block comprises multiple super-pages, each made-up of a set of corresponding pages from the memory blocks of the super-block, and wherein storing the data comprises accumulating the new data in volatile memory until a full super-page of the new data is available for storage, and then storing and protecting the full super-page in the redundancy zone.

6. The method according to claim 4, wherein the redundancy zone comprises multiple super-blocks, and comprising, upon failure of some of the memory blocks in the super-blocks, forming a new super-block from functional memory blocks drawn from the super-blocks having the failed memory blocks.

7. The method according to claim 1, and comprising alternating an assignment of the new parity block and the old parity block among the memory blocks of the redundancy zone.

8. The method according to claim 1, wherein the memory blocks comprise multi-level memory cells that are each capable of storing at least a Least Significant Bit (LSB) and a Most Significant Bit (MSB), and wherein protecting the stored data comprises storing the redundancy information using only the LSB of the memory cells.

9. The method according to claim 1, wherein defining the redundancy zone comprises selecting the memory blocks for inclusion in the redundancy zone in an interleaved manner from a total plurality of the memory blocks of the non-volatile memory.

10. The method according to claim 1, wherein assigning the alternative block comprises assigning a new open block in another redundancy zone.

11. Apparatus, comprising:
    an interface, which is configured to communicate with a non-volatile memory that includes multiple memory blocks; and
    a processor, which is configured to define in the non-volatile memory a redundancy zone that comprises at least an old parity block, a new parity block and multiple active blocks of which one block is defined as an open block, to store data in the redundancy zone and protect the stored data such that new input data is stored in the open block, redundancy information for the active blocks including the open block is stored in the new parity block, and the redundancy information for the active blocks excluding the open block is stored in the old parity block, and, upon filling the open block and the new parity block, to assign an alternative block to serve as the open block and to assign the new parity block to serve as the old parity block.

12. The apparatus according to claim 11, wherein the processor is configured, upon detecting a failure in a memory block in the redundancy zone, to reconstruct the data stored in the failed memory block using the redundancy information stored in the new parity block and in the old parity block.

13. The apparatus according to claim 11, wherein the alternative block comprises a retired memory block that comprises only invalid data.

14. The apparatus according to claim 11, wherein the open block and the other active blocks each comprises a respective super-block made-up of a first predefined number of the memory blocks, and wherein the new parity block and the old parity block each comprises a second predefined number of the memory blocks that is different from the first number.

15. The apparatus according to claim 14, wherein each super-block comprises multiple super-pages, each made-up of a set of corresponding pages from the memory blocks of the super-block, and wherein the processor is configured to accumulate the new data in volatile memory until a full super-page of the new data is available for storage, and then to store and protect the full super-page in the redundancy zone.

16. The apparatus according to claim 14, wherein the redundancy zone comprises multiple super-blocks, and wherein the processor is configured, upon failure of some of the memory blocks in the super-blocks, to form a new super-block from functional memory blocks drawn from the super-blocks having the failed memory blocks.

17. The apparatus according to claim 11, wherein the processor is configured to alternate an assignment of the new parity block and the old parity block among the memory blocks of the redundancy zone.

18. The apparatus according to claim 11, wherein the memory blocks comprise multi-level memory cells that are each capable of storing at least a Least Significant Bit (LSB) and a Most Significant Bit (MSB), and wherein the processor is configured to store the redundancy information using only the LSB of the memory cells.

19. The apparatus according to claim 11, wherein the processor is configured to select the memory blocks for inclusion in the redundancy zone in an interleaved manner from a total plurality of the memory blocks of the non-volatile memory.

20. The apparatus according to claim 11, wherein the processor is configured to assign the alternative block by assigning a new open block in another redundancy zone.

21. A method, comprising:
- in a non-volatile memory that includes multiple memory blocks, defining a redundancy zone that comprises at least a parity super-block and multiple active super-blocks, one of which is defined as an open super-block, wherein each of the super-blocks comprises two or more of the memory blocks of the memory;
- storing data in the redundancy zone and protecting the stored data such that new input data is stored in the open super-block, redundancy information for the active super-blocks including the open super-block is stored in a first area of the parity super-block, and the redundancy information for the active super-blocks excluding the open super-block is stored in a second area of the parity super-block; and
- upon detecting a failure in a memory block in the redundancy zone, reconstructing the data stored in the failed memory block using the redundancy information stored in the parity super-block.

22. Apparatus, comprising:
- an interface, which is configured to communicate with a non-volatile memory that includes multiple memory blocks; and
- a processor, which is configured to define in the non-volatile memory a redundancy zone that comprises at least a parity super-block and multiple active super-blocks, one of which is defined as an open super-block, wherein each of the super-blocks comprises two or more of the memory blocks of the memory, to store data in the redundancy zone and protect the stored data such that new input data is stored in the open super-block, redundancy information for the active super-blocks including the open super-block is stored in a first area of the parity super-block, and the redundancy information for the active super-blocks excluding the open super-block is stored in a second area of the parity super-block, and, upon detecting a failure in a memory block in the redundancy zone, to reconstruct the data stored in the failed memory block using the redundancy information stored in the parity super-block.

* * * * *